July 28, 1970 M. S. SHEBANOW ET AL 3,521,880

PROCESSING STATION WITH DOCUMENT HANDLING AND ALIGNING MEANS

Filed Dec. 30, 1968 2 Sheets-Sheet 1

MICHAEL S. SHEBANOW
FRANK A. DIGILIO
RONALD F. BORELLI
INVENTORS

PROCESSING STATION WITH DOCUMENT HANDLING AND ALIGNING MEANS

Filed Dec. 30, 1968

MICHAEL S. SHEBANOW
FRANK A. DIGILIO
RONALD F. BORELLI
INVENTORS

United States Patent Office 3,521,880
Patented July 28, 1970

3,521,880

PROCESSING STATION WITH DOCUMENT HANDLING AND ALIGNING MEANS

Michael S. Shebanow, Frank A. Digilio, and Ronald F. Borelli, Medfield, Mass., assignors to Honeywell Inc., Minneapolis, Minn., a corporation of Delaware Filed Dec. 30, 1968, Ser. No. 787,856
Int. Cl. B65h 9/20; G01p 13/00
U.S. Cl. 271—57 6 Claims

ABSTRACT OF THE DISCLOSURE

A high speed record handling and processing station for performing punching, read-write or other data operations. A low inertia fast response record transport means having a high mass, low spring rate card aligning means, moves documents through a processing unit where data operations are performed thereon. A record tracking monitor indicates incremental progress of the documents along a predetermined path relative to the station; and a control unit, responsive to the tracking monitor output signals, coordinates the processing and transport operations in accordance with the incremental positions assumed by the document.

BACKGROUND OF THE INVENTION

The present invention concerns a new and improved record processing station associated with data processing apparatus. More particularly the invention concerns a high speed record transport means including novel low inertia drive means and aligning means for maintaining records in registration with a reference surface during their transfer through the processing station.

For purposes of illustration the record transport and aligning means are described in conjunction with a card punch unit wherein the invention has special application. However, it will be understood that the novel system of the present invention has utility in other widely varied applications.

Unit records upon which data is contained in the form of position encoded marks are in common use in data processing systems; for example, taking the form of the well known punched cards. In handling such records as well as in performing data operations thereupon, it is necessary to provide transport means for moving the records through a processing station. Furthermore, it is desirable that the cards be held in registration with a reference surface on the processing unit during their translation through the processing station whereby the necessary data operations may be accurately performed upon the desired informational areas of cards.

Conventionally, cards have been transported or driven through such a processing station by rotating members which grip the cards and impart motion thereto in the desired direction of translation. It is also known to provide aligning belts or rolls which are disposed askew the path of longitudinal travel of a document and cooperate with a primary drive means such as a belt or single roll to drive a sheet obliquely into contact with an alignment or registration edge. However, after contact is established such a roll continues to drive the sheet obliquely. Thus, as the sheet is driven along the edge it may be scuffed or damaged as slippage occurs between the sheet and the aligning means. Also, with such arrangements the sheet must have sufficient rigidity to be guided by the registration edge. Therefore such arrangements cannot be used to drive and align thin or flimsy sheets since the sheets would buckle or wrinkle and the edges of the sheets would be damaged.

It is also known to use casters which hold a sheet in contact with a moving driving surface. These caster rolls are spring biased to normally assume an angle oblique to the direction of motion of the driving surface and of a registration edge. After a sheet strikes the registration edge it turns into alignment with the edge and thus swivels the caster rolls against the spring bias. However, as the sheet becomes aligned with the registration edge, the spring bias increases progessively to a maximum value, and thereafter remains at the maximum value and acts via the caster rolls to impart a large aligning component force to the sheet, which tends to damage the edge of the sheet.

In these previously proposed arrangements the driven aligning belt or single roll merely supplements but does not take the place of the primary sheet driving means that must be used to drive the edges generally parallel to and along the registration edge. Still other arrangements have been proposed to align documents wherein a single roller operates as a combination sheet driving and aligning member. In these arrangements, the roller is oriented at a desired oblique angle to drive a sheet into contact with a registration edge. Each circular roller is provided with a plurality of radial slots extending inwardly from its outer periphery to form a corresponding plurality of flexible sector like fingers or sections which contact the sheet to drive it at an oblique angle over the guide surface and toward the registration edge. With arrangements of this kind it is necessary to provide a plurality of staggered driving discs since an individual disc does not impart sufficient oblique force to the document to control its movement and prevent fishtail. Likewise the lateral distance of document movement required to correct the alignment of a card with this type of device is significant and prohibits the use of such an arrangement in a high speed document handling operation.

Another improved record handling system is disclosed in U.S. Pat. No. 3,342,410 to Earl E. Masterson et al. In the Masterson system a document is advanced on the fly to a record processing station wherein it is gripped by two pair of magnetic pinch rolls which are rotated by a shell motor. The motor movement is controlled by a velocity servo system to selectively advance the card in increments and stop it at desired positions with respect to a card punch. The document is held in registration with a reference surface by the pressure of a spring against the edge of the card. The Masterson transport system is a significant improvement over the prior art in that it is extremely simple and reliable. However, the described system has certain inherent characteristics which limit its use in an ultra high speed punch operation. For example, if the speed of the driving motor were increased to provide a high speed incrementing system, the larger power dissipation of the motor would require the use of external cooling equipment. Furthermore, the higher speed of the motor would result in slower system response time with poorer positional accuracy of the card movement in the system.

SUMMARY OF THE INVENTION

Accordingly it is an object of the invention to provide a record processing station having a coordinated record transport means and document aligning means capable of selectively driving a document through incremental positions at high speed while maintaining the document in proper alignment with a registration edge.

It is another object of the invention to provide a low inertia transport means having a single drive roller which is capable of selectively driving a document through incremental position at high speed with good positional accuracy and low power dissipation.

It is a further object of the invention to provide a record processing station having a coordinated record transport means and document alignment means capable of driving a document through incremental positions at high speeds wherein document alignment is completed within a short travel distance along the transport path, alignment time is reduced, and fishtail is eliminated.

The foregoing objects are accomplished by the novel apparatus of the present invention comprising a processing station for record handling having a unit for performing data operations on a document; a low inertia, fast response record transport means having card aligning means; a record tracking monitor to indicate record position along a predetermined path relative to the processing station; and a control unit responsive to the tracking monitor for coordinating the processing and transport operations of the document in accordance with incremental positions assumed by the document along the transport path.

The processing unit may be a card punch, a magnetic read-write head, or any other suitable unit for performing data operations upon a document. The record transport means comprises a low inertia system including a single drive roller, a pinch roll and magnetic control therefore cooperating with the drive roller to pinch the document, a shell motor for powering the drive roller, a tachometer for sensing the speed of the motor to provide a control reference signal and a control unit for selectively applying power to the motor in accordance with the reference and tracking signals. Card aligning means comprising one or more blocks having a mass of predetermined value mounted upon flexure means to contact the edge of the document are provided to align the document and hold it in contact with a registration edge. A record strobing system is provided for correlating the passage of a trailing edge of the document with the location of informational zones thereon comprising a light surce, means for detecting light which selectively passes through apertures in the transport plate, and means for developing tracking signals for coordinating the processing and transport operations of the document in accordance with the incremental positions assumed by the trailing edge of the document.

BRIEF DESCRIPTION OF THE DRAWINGS

Further objects of the invention together with features and advantages thereof will become apparent from the accompanying drawings in which.

DETAILED DESCRIPTION OF THE INVENTION

Figure 1:
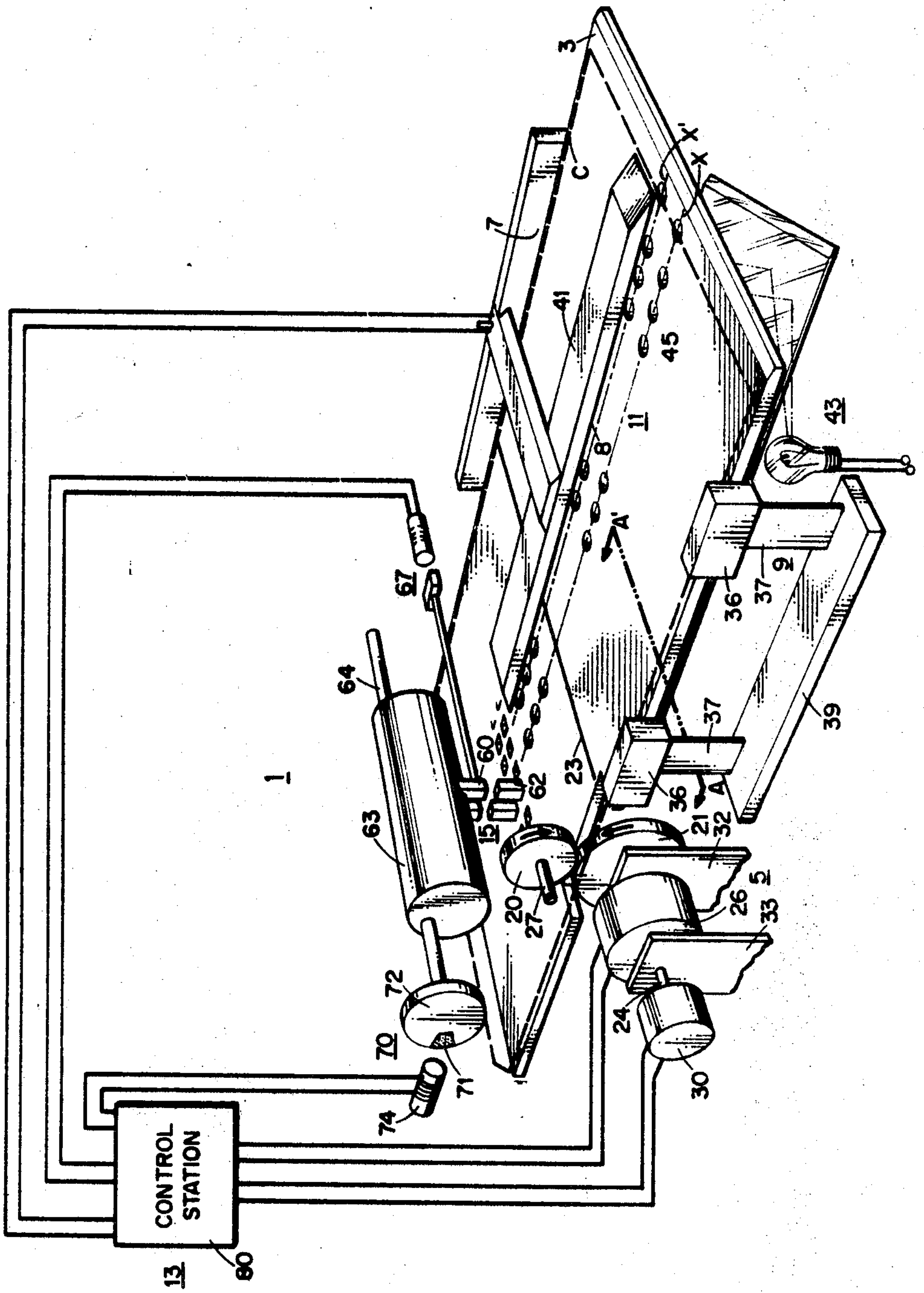
FIG. 1 is a perspective, partially diagrammatic view of the preferred embodiment of the invention as used in a processing station including a card punch, record transport means, a record monitor and a processing control unit.

Referring now to the drawings, the invention is explained with reference to a punch unit wherein the medium to be perforated, e.g. a card, moves in conventional manner below the lower ends of a plurality of punch knives. However, it should be understood that the invention has utility in a variety of other applications. Thus, the invention could be used in any environment where the selective transportation and alignment of documents past a predetermined location is desired.

A document processing station 1 is indicated as generally comprising a platform 3 across which a document C is transported in predetermined increments by a driving means 5. The document is held in registration with a reference surface 7 by aligning means 9. Monitoring means 11 are provided to sense the position of the trailing edge of the document and provide position logic signals to a control station 13. The control station coordinates the movement of the document with data operations to be performed on the card by a processing unit generally indicated at 15.

As shown, the transport means comprise a single pair of roller 20, 21 mounted in a cut-out in the platform 3 to respectively engage both sides of the document near the edge thereof as the document reaches line 23. Roller 21 is mounted on a transport drive shaft 24 which is adapted to be selectively rotated by the variable velocity field coupled transport motor 26. Roller 20 is mounted on a shaft 27 and bearing not shown to resiliently engage roller 21. For example, a conventional magnetic pinch roll arrangement may be used to provide the proper frictional engagement of the document by rollers 20, 21. A single drive roller is used to provide a low inertia transport system and in order to avoid the punch mechanism the drive roller is located to engage the edge rather than the center of the card. This results in the application of a rotational moment to the card each time it is accelerated. However, the use of novel card aligning means in conjunction with the transport eliminates problems resulting therefrom. A tachometer 30 is mounted on the other end of the motor shaft for sensing the rotational velocity thereof to provide feedback to establish a control reference signal for the transport motor. The motor shaft is rotatably supported by bearings 32, 33 in a conventional manner.

Transport motor 26 is arranged to be directionally and proportionally responsive to electrical control signals whereby the drive shaft of the transport motor may be rotated at prescribed speeds and in a prescribed direction in response to the level and polarity of the control signals without the intervention of clutch or brake means. The motor is of a non-ferromagnetic rotor air core type, having little megnetizable metal in the rotor and being arranged to rotate through the shifting path of driving stator flux. Such a motor exhibits a high torque to inertia ratio and may be directly responsive to velocity control signals for demand transport control. Braking is effected simply by rotor field reversal which eliminates the need for actuators, clutches, brakes and eliminates the friction losses therefrom. It also allows a continuous analog control of torque output rather than the usual incremental step control of clutch couplings.

The tachometer 30 provides a means for adjustably controlling velocity according to the amount of reference voltage generated thereby and applied to control the energization of motor 26. Motor 26 thus provides a directly responsive drive means for advancing documents and is especially adapted for use of strobe means described according to the invention. The drive motor, shaft, rollers and tachometer comprise a low inertia position referable servo transport means adapted to drive punched records to positions defined with respect to the processing station in a manner indicated hereinafter.

Alignment means 9 are provided to hold a document or card passing through the proccessing station in registration with reference edge 7 of the platform. The alignment means generally comprise one or more aligning blocks 36, each supported by a spring 37 attached to a support 39 by suitable means. A single block could be used; however it is preferable to use at least two blocks as shown in FIG. 1 so that at least one block is in contact with a card during all of its movement through the processing station.

The blocks are designed to have a combined mass which is very much greater than the mass of an individual card for a purpose explained hereinafter. The spring 37 on the other hand has a low strength which provides a restoring force very much less than the force applied to the guide block by an incoming card.

Figure 2:
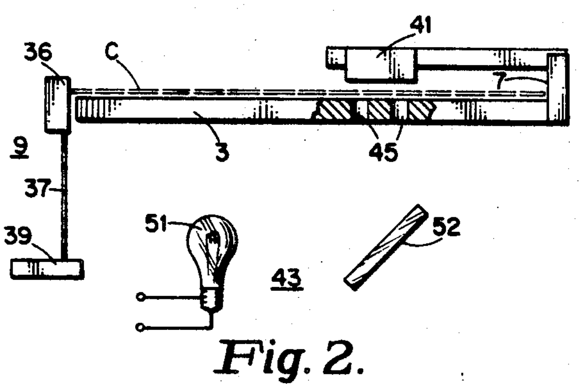
FIG. 2 is an enlarged partial right elevational view of the embodiment of FIG. 1.

Each spring 37 normally supports its corresponding block in a position out of contact with the platform 3 whereby the block will engage only the edge of a card as it is moved through the station, as shown in FIGS. 1 and 2. The leading edge of the first block may be rounded slightly so that an incoming card will not hang-up on initial contact therewith. As the card moves on to the platform on the fly, the spring 37 will deform to allow the card to pass. Thus the spring serves to adjust the block 36 to accommodate cards of various widths or cards which are slightly misaligned as they approach the platform 3. Although of low strength, the spring 37, if deformed, will return the guide block and card to a position in registration with the reference surface prior to the incrementing of the card by the transport means. Thereafter the block and spring means cooperate to hold the card, when under static balance, i.e. at rest, lightly against the registration edge without unduly biasing or damaging the card.

Figure 4A:
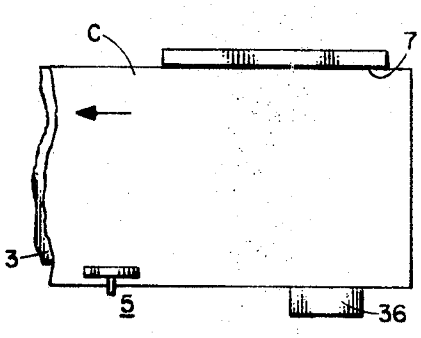
FIG. 4*a* is a diagrammatic view of a correctly aligned document being advanced through a processing station.
Figure 3:
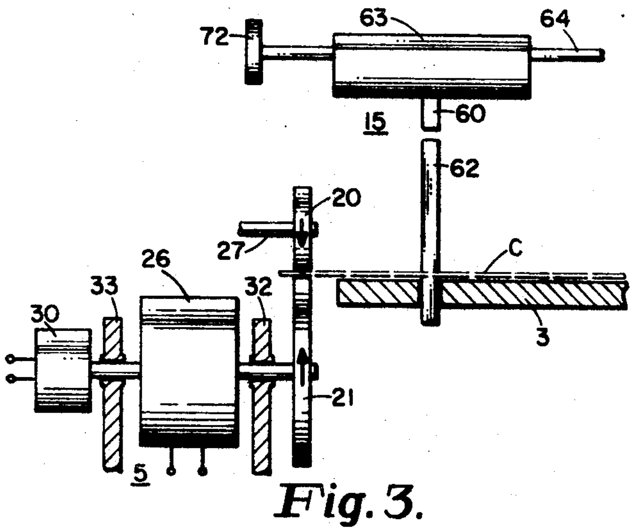
FIG. 3 is an enlarged partial sectional view taken along the line A—A of FIG. 1.
Figure 4B:
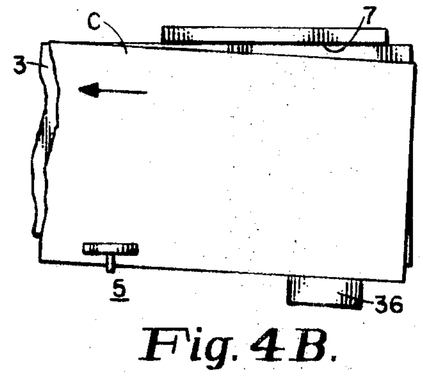
FIG. 4*b* is a diagrammatic view of a skewed document being advanced through a processing station.

The influence of the guide blocks 36 upon the card during dynamic conditions is explained in conjunction with FIGS. 4*a* and 4*b*. Thus with a single incrementing wheel engaging the elongated side of the card, each time the card is accelerated, a force is applied along one side of the card which creates a turning force on the card sufficient to cause it to fishtail in the absence of controlling means. However, with block 36 in contact with the card, any acceleration of the card causes a corresponding force to be applied from the card to the block. The force applied by the card to the aligning block in turn causes a reactive force of opposite magnitude to be applied to the card. If the combined mass of the blocks 36 is very much greater than the mass of the card, the blocks 36 will act as a dynamic wall, the net turning moment applied to the accelerated card will be zero and fishtailing will be completely eliminated. This is the condition shown in FIG. 4*a*. However, in the event the mass of the aligning blocks is insufficient, the turning moment applied to the card will overcome the dynamic force applied by the blocks 36 and cause the card to fishtail. This drives block 36 away from reference edge 7 whereby the data operations upon the card are incorrectly registered as shown in FIG. 4*b*.

The monitoring means 11 are shown in FIGS. 1 and 2 as generally comprising a strobe package 41 suspended above the platform and aperture means 45 arranged at prescribed locations in the platform 3. Thus, platform 3 has two rows of strobe apertures arranged along parallel strobe axes in prescribed relation with the strobe detector package. The strobe axes are chosen so that apertures 45 will not register with any portion of the informational areas of punched cards as they are transported in alignment across the plate; but will register instead along prescribed internal strips. Apertures 45 are spaced apart along the axes by two column distances, preferably so as to be uncovered by trailing edge portions of the card when predetermined information zones arrive in data positions at the processing position. The platform 3 is illuminated from below by a light source comprising lamp 51 and a mirror 52 arranged as shown in FIG. 2 to reflect light upon a preselected portion of the bottom of platform 3. Thus, associated strobe detector cells in the strobe package will sense light which progressively emerges through the apertures 45 as the trailing edge of the card incrementally exposes the apertures in the platform. The strobe package includes means to develop an electrical signal in response to the detected light which is fed to the control station to correlate the movement of the card with the data operations to be carried out, in a manner explained hereinafter. The strobe detection system described is of a conventional type well known in the prior art. Furthermore, other suitable strobe detection systems which operate upon the trailing edge or another reference edge of a transported document could be used as well.

The processing unit shown in the preferred embodiment is a punch. However, it should be apparent that any other desired data operation could be performed upon the document in accordance with the present invention. The card punch is adapted to perforate a card C at prescribed column positions as known in the art. More particularly, the punch comprises an arrangement for punching pairs of card columns simultaneously. Punching is accomplished by driving interposers 60 downward into contact with punch knives 62. A pair of interposers and a pair of corresponding punch knives are shown in FIG. 1. However, it should be understood that each column of knives would normally include 12 knives, i.e. one knife for each row in a card column. The knife sets are arranged to be driven through holes in platform 3 across which the cards are stepped by the transport means in incremental fashion. A pictorial representation of a conventional punch unit is shown generally comprising a punch shaft 64 adapted to be driven rotatingly, by means not shown, to reciprocate a supporting punch bail 63 mounted eccentric thereto as is conventional. Interposers 60 are pivotably suspended from the support bail to reciprocate vertically and impact corresponding ones of the associated punch knives when selected by means 67. Select means 67 are shown in schematic form and may comprise any one of a number of conventional means for controlling the selective coupling of the continuously rotating punch bail to the punch knives via the interposers 60. Thus, the select means function to selectively thrust an associated interposer into knife driving engagement when attracted by an associated solenoid in response to a punch signal from the control unit.

A punch position monitor generally indicated as 70 is provided to generate reference signals indicative of the home position of the synchronously operated punch bail. A magnetic insert 71 in wheel 72 is periodically sensed by means 74 which produces a reference signal in response to the upper position of the punch bail. Any other conventional means for determining the position of the interposers would be suitable. A conventional control unit 13 is provided to coordinate the translation of the document through the processing station with the data operations to be performed upon the document. Thus, the control unit 80 receives input signals from the tachometer, the strobe cell detector and the punch position monitor and provides output pulses which selectively control the punch selection means and the transport means.

Figure 5:
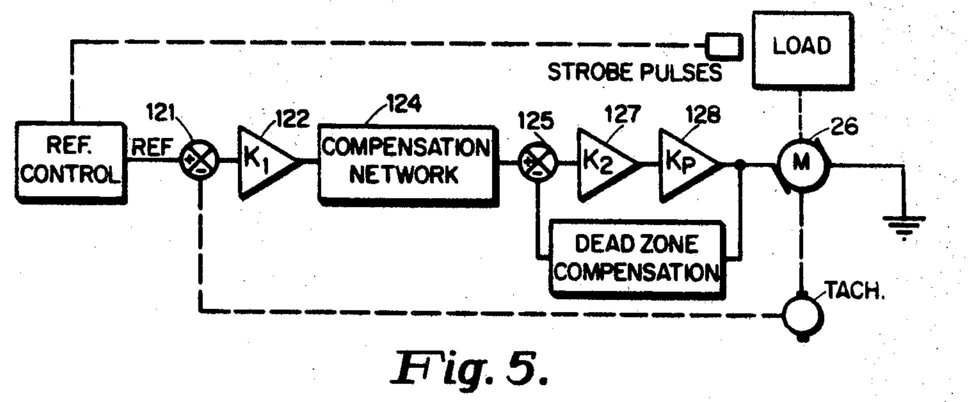
FIG. 5 is a block diagram of a servo control system suitable for use with the apparatus of the present invention.

The signal provided to the punch selection means may take the form of a digital pulse train or an analog signal of prescribed waveform. The signal to the transport means comprises an analog input to the motor in order to provide a fast response. FIG. 5 is a schematic of a servo system which describes the operation of the transport motor, tachometer and control system of the present invention. As shown, the strobe pulses are applied to a reference control unit which provides reference signals to be applied to the summing point 121. Summing point 121 also receives feedback signals from the tachometer which senses the velocity of motor 41. Amplifier 122 provides an output to a compensation network 124 and thence to a summing point 125. Amplifiers 127, 128 are provided in series and a negative feedback loop is shown from the output of amplifier 128 to the summing point 125 through a dead zone compensation network. The stabilized output of amplifier 128 is then feed as a motor control signal to transport motor 41.

The controlled variable of the system shown in FIG. 5 is angular velocity. The positional accuracy of the system depends upon how well this velocity is regulated. Thus, when a positive voltage level appears on the reference input, the card under the frictional force of the drive roller and pressure roller is accelerated from rest to a state of constant velocity. This constant velocity is sustained by a small error voltage resulting from the difference between the reference voltage and the tachometer feedback voltage. The error voltage is just large enough to overcome the friction of the system and maintain the card in a state of constant velocity. This constant velocity state is maintained under the servo control system until the trailing edge of the card uncovers a photocell which provides a braking signal. During the acceleration from rest and translation at constant velocity, the card is held in alignment by blocks 36 which prevents card fishtail. Upon reception of the braking signal the reference voltage returns to zero and the card decelerates to a position properly registered for punching. The punching operation is then carried out in response to punch signal from the control unit. The punch interposer is returned to a home position and a positive level received again at the reference point to initiate the beginning of another incremental advance of the card.

The use of a low inertial drive system as described permits a high speed incrementing system without excessive power dissipation. This drive system also results in a smaller braking due to the fast response of the system.

The inveniton described herein is a significant improvement over the prior art in that it utilizes a novel low inertia, one sided transport means having a fast response time at high incrementing speeds. The card alignment means utilized in conjunction with the transport means is of a simple and economical design which has many advantages over the prior art. The transport and alignment means cooperate to eliminate one of the most difficult problems in transporting documents. Thus, the present invention eliminates the necessity for maintaining equal or balanced traction on a driven document from paired tractor means working on opposed sides of the document.

What is claimed is:

1. In a record processing system, record tracking means for sensing the advance of unit records along a predetermined path relative to a processing station and producing a strobe signal in response thereto;

transport means for selectively advancing said records, including single drive roll means for advancing said records, single pinch roll means cooperating with said drive roll means for selectively engaging said records, motor means directly coupled to said drive roll means for acceleration and deceleration thereof, and speed sensing means directly coupled to said drive roll means for developing a reference signal indicator of the movement of said motor means; and a control unit for controllably energizing said motor means in response to said strobe signal and said reference signal.

2. A record processing system as described in claim 1 wherein said pinch roll means and drive roll means are adapted to engage said unit records along an off-center axis of said records.

3. A record processing system as described in claim 2 further including a record aligning means for maintaining said records in registration with a reference surface relative to said path including an aligning block of predetermined mass with respect to the mass of an individual record, and means for flexibly suspending said block adjacent said record path.

4. A position responsive system for advancing unit records along a prescribed path past a processing station and operating upon said records with continuous reference to the position thereof, comprising:

record tracking means disposed along said path relative to said station for producing a strobe signal which indicates incremental positions assumed by said records with respect to said station.

record transport means for selectively advancing said records along said path in a prescribed manner as indicated by said strobe signals including single drive roll means for advancing said records, means cooperating with said drive roll means for selectively engaging said records, low inertia motor means directly connected to said drive roll means for the acceleration and deceleration thereof, and sensing means connected to said motor means for producing a reference signal proportional to the velocity of said motor means, and a control unit for receiving said reference signal and said strobe signal and controllably energizing said motor means in response thereto.

5. A system as described in claim 4 further including means for aligning said records relative to said path including an aligning block of predetermined mass with respect to the mass of a record and means for suspending said block adjacent to said path to hold said records in contact with a reference surface.

6. In a record processing apparatus record tracking means for sensing the advance of unit records over a platform along a predetermined path relative to a processing station and producing a strobe signal in response thereto, record transport means for selectively advancing said records along said path in a predetermined mode as indicated by said strobe signals, a reference surface adjacent to said platform, aligning block means associated with said platform having a predetermined mass relative to the mass of one of said records for retaining said records in contact with said reference surface during the advance thereof, and means for controllably energizing said motor in response to said strobe signals.

References Cited

UNITED STATES PATENTS

| | | | |
|---|---|---|---|
| 2,996,166 | 8/1961 | Bradshaw et al. | 271—47 XR |
| 3,307,845 | 3/1967 | Anderson | 271—57 |

EVON C. BLUNK, Primary Examiner

J. WEGBREIT, Assistant Examiner

U.S. Cl. X.R.

271—47, 59